United States Patent
Landers et al.

(10) Patent No.: US 11,260,959 B2
(45) Date of Patent: Mar. 1, 2022

(54) INTEGRATED THRUST AND DRAG CONTROL OF AN AIRCRAFT

(71) Applicant: Gulfstream Aerospace Corporation, Savannah, GA (US)

(72) Inventors: Thomas Landers, Savannah, GA (US); Michael Malluck, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 198 days.

(21) Appl. No.: 16/513,340

(22) Filed: Jul. 16, 2019

(65) Prior Publication Data
US 2021/0016871 A1    Jan. 21, 2021

(51) Int. Cl.
| | | |
|---|---|---|
| *B64C 13/16* | (2006.01) | |
| *B64C 3/58* | (2006.01) | |
| *B64C 9/18* | (2006.01) | |
| *B64C 9/32* | (2006.01) | |
| *B64C 25/10* | (2006.01) | |
| *B64D 17/80* | (2006.01) | |

(52) U.S. Cl.
CPC ............... *B64C 13/16* (2013.01); *B64C 3/58* (2013.01); *B64C 9/18* (2013.01); *B64C 9/323* (2013.01); *B64C 25/10* (2013.01); *B64D 17/80* (2013.01)

(58) Field of Classification Search
CPC ......... B64C 13/16; B64C 13/18; B64C 13/20; B64C 3/58; B64C 9/18; B64C 9/323
See application file for complete search history.

(56) References Cited

U.S. PATENT DOCUMENTS

| | | | | |
|---|---|---|---|---|
| 5,564,652 A | * | 10/1996 | Trimbath | B64C 5/00 244/99.1 |
| 6,561,463 B1 | * | 5/2003 | Yount | B64C 9/32 244/196 |
| 6,860,452 B2 | * | 3/2005 | Bacon | B64C 13/505 244/194 |
| 8,052,095 B2 | * | 11/2011 | Wilson | B64C 13/16 244/188 |
| 2011/0270470 A1 | | 11/2011 | Jackson et al. | |
| 2012/0253557 A1 | * | 10/2012 | Min | G05D 1/0676 701/3 |
| 2014/0039731 A1 | | 2/2014 | Boada-Bauxell et al. | |

(Continued)

FOREIGN PATENT DOCUMENTS

EP    2423773 A1    2/2012

*Primary Examiner* — Philip J Bonzell
*Assistant Examiner* — Tye William Abell
(74) *Attorney, Agent, or Firm* — LKGlobal | Lorenz & Kopf, LLP

(57) ABSTRACT

Aircraft, auto speed brake control systems, and methods for controlling drag of an aircraft are provided. In one example, an aircraft includes an aircraft structure. A drag device is operatively coupled to the aircraft structure between a stowed and a deployed position and/or an intermediate deployed position. A speed brake controller is in communication with the drag device to control movement. An autothrottle-autospeedbrake controller is in communication with the speed brake controller and is configured to receive data signals. The autothrottle-autospeedbrake controller is operative to direct the speed brake controller to control movement of the drag device between the stowed position and the deployed position and/or the intermediate deployed position in response to at least one of the data signals.

7 Claims, 3 Drawing Sheets

(56) References Cited

U.S. PATENT DOCUMENTS

| | | | | |
|---|---|---|---|---|
| 2016/0318601 A1* | 11/2016 | Arnold | ................. | B64C 9/12 |
| 2017/0341772 A1* | 11/2017 | Reis | ................. | B64D 31/06 |
| 2019/0176966 A1* | 6/2019 | Eddy | ................. | B64C 13/504 |
| 2019/0300155 A1* | 10/2019 | Iarocci | ................. | B64C 9/323 |
| 2020/0055585 A1* | 2/2020 | Hung | ................. | B64C 39/024 |

* cited by examiner

INTEGRATED THRUST AND DRAG CONTROL OF AN AIRCRAFT

TECHNICAL FIELD

The technical field relates generally to controlling thrust and drag of an aircraft, and more particularly, relates to automated control of thrust and drag device(s) of an aircraft in response to various data signals that, for example, correspond to an aircraft speed, an aircraft altitude, an aircraft speed target, and/or a throttle position.

BACKGROUND

Aircraft are designed to have low drag. Many aircraft however employ manually actuatable drag devices such as spoilers, speed brakes, or the like to increase drag. These drag devices can be mounted on the fuselage or the wings of an aircraft, and when deployed will spoil lift and/or increase drag, for example to more rapidly decrease altitude without excessive speed increase or more rapidly decrease speed when descending for landing.

When a pilot or other crew member needs to spoil lift or decrease the speed of the aircraft, they will typically manually deploy a drag device(s) to increase the drag of the aircraft. For example, the drag device(s) may be deployed by pulling or otherwise manually actuating a speed brake handle.

Unfortunately, manually deploying drag devices can results in various issues. In one example, the drag device(s) can remain in the deployed position for too long because the pilot or other crew member did not manually retract the deployed drag device, resulting in over steeping of the aircraft. In another example, an aircraft typically descends for landing in stepwise clearings to lower altitudes. As the aircraft levels off at each clearing, the pilot or other crew member or automatic speed control system may direct the engine(s) to produce more thrust to overcome the drag created by deployed drag device(s). Alternatively, the pilot or other crew member may have to further multitask and manually retract the speed brake handle at each clearing and then deploy the drag device again for descending to the next clearing.

Accordingly, it is desirable to provide an aircraft, a system, and a method for controlling drag of an aircraft that addresses one or more of the foregoing issues in an ergonomically efficient manner. Furthermore, other desirable features and characteristics of the various embodiments described herein will become apparent from the subsequent detailed description and the appended claims, taken in conjunction with the accompanying drawings and this background.

SUMMARY

Various non-limiting embodiments of an aircraft, an auto speed brake control system for controlling drag of an aircraft, and a method for controlling drag of an aircraft, are provided herein.

In a first non-limiting embodiment, the aircraft includes, but is not limited to, an aircraft structure. The aircraft further includes, but is not limited to, a first drag device operatively coupled to the aircraft structure to move between a first stowed position and a first deployed position and/or a first intermediate deployed position. The aircraft further includes, but is not limited to, a speed brake controller in communication with the first drag device for controlling movement of the first drag device. The aircraft further includes, but is not limited to, an autothrottle-autospeedbrake controller in communication with the speed brake controller. The autothrottle-autospeedbrake controller is configured to receive a plurality of data signals. The data signals include an aircraft speed data signal, an aircraft altitude data signal, and a speed target data signal. The autothrottle-autospeedbrake controller is operative to direct the speed brake controller to control movement of the first drag device between the first stowed position and the first deployed position and/or the first intermediate deployed position in response to at least one of the data signals.

In another non-limiting embodiment, the auto speed brake control system includes, but is not limited to, a speed brake controller configured to communicate with a drag device for controlling movement of a drag device between a stowed position and a deployed position and/or an intermediate deployed position. The auto speed brake control system further includes, but is not limited to, an autothrottle-autospeedbrake controller. The autothrottle-autospeedbrake controller is configured to receive a plurality of data signals. The data signals include an aircraft speed data signal, an aircraft altitude data signal, and a speed target data signal. The autothrottle-autospeedbrake controller is operative to direct the speed brake controller to control the movement of the drag device between the stowed position and the deployed position and/or the intermediate deployed position in response to at least one of the data signals.

In another non-limiting embodiment, the method includes, but is not limited to, receiving a plurality of data signals to an autothrottle-autospeedbrake controller. The data signals include an aircraft speed data signal, an aircraft altitude data signal, and a speed target data signal. The method further includes, but is not limited to, communicating a command signal from the autothrottle-autospeedbrake controller to a speed brake controller in response to at least one of the data signals. The command signal is for moving a first drag device. The method further includes, but is not limited to, controlling movement of the first drag device between a first stowed position and a first deployed position and/or a first intermediate deployed position via the speed brake controller in response to the command signal.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
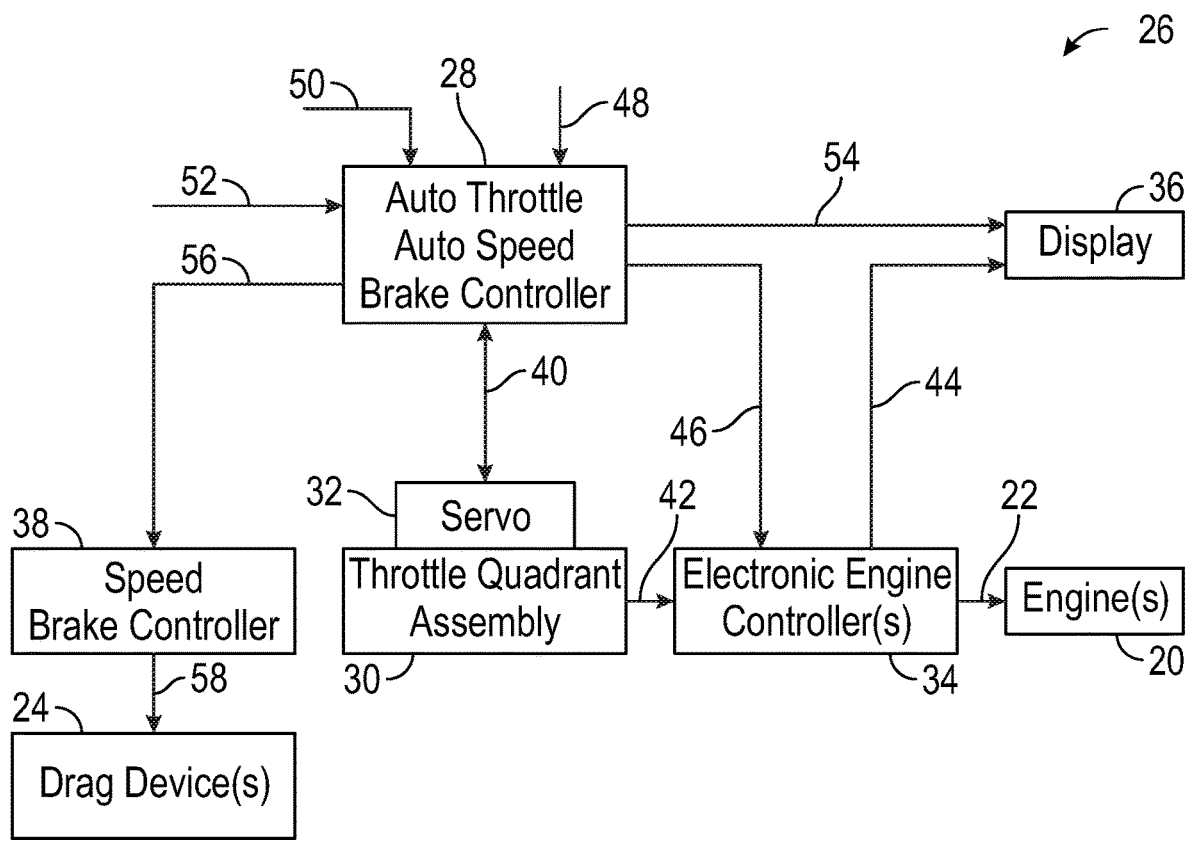
FIG. 1 illustrates a block diagram of a system for controlling drag of an aircraft in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to aircraft, auto speed brake control systems for controlling drag of aircraft, and methods for controlling drag of aircraft. The exemplary embodiments taught herein provide an aircraft having an aircraft structure. In an exemplary embodiment, the aircraft structure includes a fuselage with a first side and a second side that is opposite the first side. The fuselage has a first wing and a second wing extending laterally outward from the first and second sides of the fuselage, respectively.

One or more drag devices are operatively coupled to the aircraft structure, for example, to the fuselage, the first wing, and/or the second wing to move between a stowed position(s) and a deployed position(s) and/or any intermediate deployed position therebetween. A speed brake controller is in communication with the drag device(s) for controlling movement of the drag device(s). An autothrottle-autospeedbrake controller is in communication with the speed brake controller. The autothrottle-autospeedbrake controller is configured to receive a plurality of data signals. In an exemplary embodiment, the data signals include an aircraft speed data signal, and a speed target data signal. The autothrottle-autospeedbrake controller is operative to direct the speed brake controller to control movement of the drag device(s) between the stowed position(s) and the deployed position(s) in response to at least one of the data signals.

In an exemplary embodiment, advantageously the autothrottle-autospeedbrake controller automates movement of the drag device(s) only when the aircraft is on autopilot and with automatic speed control active, and in certain modes of pitch and speed control. In another exemplary embodiment, advantageously the autothrottle-autospeedbrake controller automates movement of the drag device(s) any time the automatic speed control is active but may still depend on the pitch and speed control modes of the flight director.

In an exemplary embodiment, advantageously the autothrottle-autospeedbrake controller automates movement of the drag device(s) between the stowed position(s) and the deployed position(s) in cooperation with the speed brake controller and in response to at least one of the data signals. This automated control of the movement of the drag device(s) allows the pilot and/or other crew members to more efficiently focus their efforts on controlling the aircraft by reducing their manual tasks. Further, automating control of the movement of the drag device(s) between the stowed position(s) and the deployed positions(s) results in the drag device(s) being deployed and retracted more efficiently when appropriate so that the pilot and/or other crew member(s) does not need to inefficiently produce additional thrust to overcome drag being created by the deployed drag device(s) that should otherwise be retracted, for example while leveling off at a clearing(s) during a multi-level descent.

Figure 2:
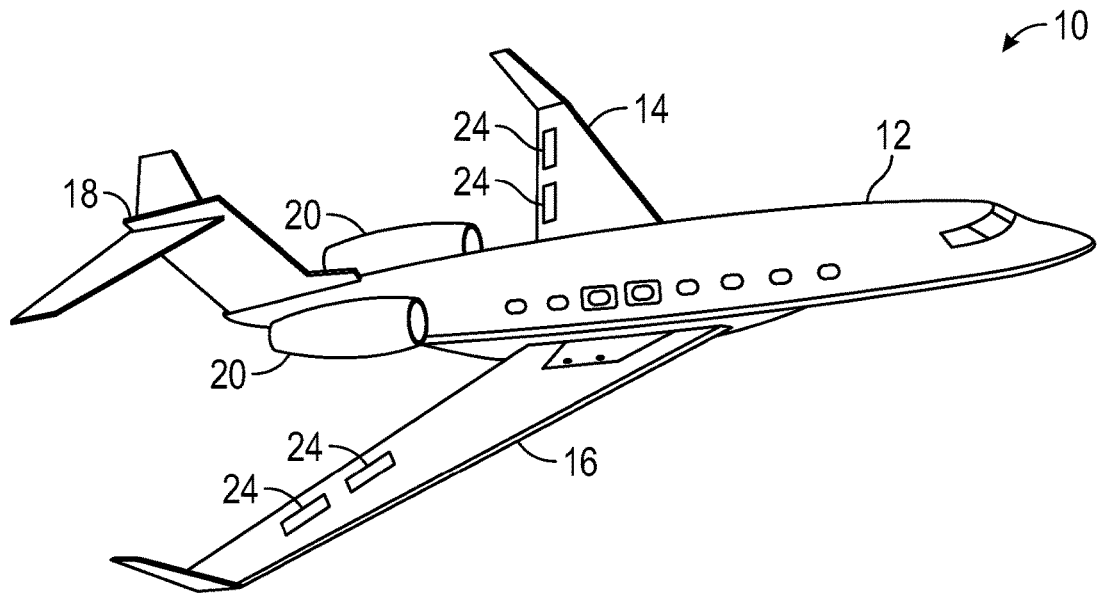
FIG. 2 illustrates a perspective view of an aircraft in accordance with an exemplary embodiment.

FIG. 2 illustrates a perspective view of an aircraft in accordance with an exemplary embodiment. The aircraft 10 includes an aircraft structure, for example, a fuselage 12 as the main body of the aircraft 10 that supports the wings 14 and 16 that extend laterally outward from opposing sides of the fuselage 12, and a tail 18. Although the aircraft 10 is illustrated as having a fuselage 12 and wings 14 and 16, it is to be understood that some aircraft may not have a fuselage (e.g., B-2 Bomber, or the like) and/or may not have wings (e.g., lifting bodies, or the like). As such, when the disclosure herein describes something as being attached to the fuselage and/or the wings, it is to be understood that it is attached to the aircraft structure. Depending on the design of the aircraft 10, there may be one or more engines 20 (e.g., two engines 20 as illustrated) that may be attached to the wings 14 and 16, or alternatively, attached to the fuselage 12. In an exemplary embodiment and as will be discussed in further detail below, the aircraft 10 includes one or more drag devices 24 that are operatively coupled to one or both of the wings 14 and/or 16 (as illustrated) and/or to the fuselage 12.

Referring also to FIG. 1, in an exemplary embodiment, the aircraft 10 includes a thrust and drag control system 26 that is configured for performing engine control functions and automated speed brake functions. As illustrated, the thrust and drag control system 26 includes an autothrottle-autospeedbrake controller 28 that is in communication with a throttle quadrant assembly (TQA) 30, optionally a servo 32, one or more electronic engine controllers 34 each correspondingly in communication with one of the engine(s) 20, and a display 36 that cooperate to perform the engine control functions. Likewise, the autothrottle-autospeedbrake controller 28 is in communication with a speed brake controller 38 that is in communication with one or more drag devices 24 for performing the automated speed brake functions.

With respect to the engine control functions, in an exemplary embodiment, the autothrottle-autospeedbrake controller 28 is operable to control engine thrust that is generated via the engine(s) 20 by transmitting throttle control commands via line 40 to the TQA 30. In an exemplary embodiment, the TQA 30 includes a throttle lever and the servo 32 is operable to move the throttle lever in response to throttle control commands from the autothrottle-autospeedbrake controller 28 to generate engine thrust commands. The TQA 30 communicates the engine thrust commands via line 42 to the electronic engine controller(s) 34. As will be discussed in further detail below, the TQA 30 further transmits throttle position data signal(s) via line 40 back to the autothrottle-autospeedbrake controller 28 that may be used with other data signals to perform the automated speed brake functions. Alternatively, the autothrottle-autospeedbrake controller 28 may communicate directly with the engine controller(s) 34 by transmitting engine thrust commands via line 46 to the electronic engine controller(s) 34.

In response to the engine thrust commands, the electronic engine controller(s) 34 controls the engine(s) 20 via line 22 to generate thrust. In an exemplary embodiment, the electronic engine controller(s) 34 include various hardware (not illustrated), software (not illustrated), and interfaces (not illustrated), such as, for example, a processor, an engine sensor input-output interface, and engine valve driver hardware. The electronic engine controller(s) 34 receives and processes data including the engine thrust commands, and further, generates engine valve control signals that are provided to the engine valve driver hardware to control the corresponding engine(s) 20 of the aircraft 10.

As illustrated, the display 36 interfaces with both the autothrottle-autospeedbrake controller 28 and the electronic engine controller(s) 34 via lines 54 and 44, respectively. The display 36 provides various engine status information and other relevant information from the autothrottle-autospeedbrake controller 28 and the electronic engine controller(s) 34 to the pilot and/or other crew member(s) in the cockpit area of the aircraft 10.

With respect to the automated speed brake functions and as briefly mentioned above, the autothrottle-autospeedbrake controller 28 is configured to receive various data signals for determining whether to deploy or stow the drag device(s) 24. In an exemplary embodiment, the data signals include aircraft speed data signals, aircraft altitude data signals, speed controller mode signals, speed target data signals, altitude target data signals, and the throttle position data signals. In particular, the aircraft speed data signals are data signals that correspond to a speed of the aircraft 10, the aircraft altitude data signals are data signals that correspond to an altitude of the aircraft 10, the speed controller module signals are data signals to a mode of a speed controller, the speed target data signals are data signals that correspond to a target speed or otherwise desired speed for the aircraft 10, the altitude target data signals are data signals that correspond to a target altitude or otherwise desirable altitude for the aircraft 10, and the throttle position data signals are data signals that correspond to a position of the throttle lever as discussed above.

In an exemplary embodiment, the data signals are transmitted to the autothrottle-autospeedbrake controller 28 by various onboard systems. For example, the data signals may include data signals transmitted from an aircraft state data system (not illustrated) via line 48, data signals transmitted from a flight management system (not illustrated) via line 50, data signals transmitted from a flight guidance panel (not illustrated) via line 52, and/or the data signals transmitted from the TQA via line 54. In an exemplary embodiment, the data signals transmitted from the aircraft state data system via line 48 include the speed data signals and the altitude data signals, and the data signals transmitted from the flight management system via line 50 include the speed controller mode signals, the speed target data signals, and the altitude target data signals. In an exemplary embodiment, the flight guidance panel includes, for example, adjustable knobs and buttons that the pilot and/or other crew members use to set the speed controller mode signals, the speed target data signals, and the altitude target data signals that may be directly or indirectly transmitted via line 52 to the autothrottle-autospeedbrake controller 28.

As illustrated, autothrottle-autospeedbrake controller 28 is in communication with the speed brake controller 38 via line 56. The speed brake controller 38 is in communication with the one or more drag devices 24 via line 58 for controlling movement of the drag device(s) 24. In an exemplary embodiment, using software that includes an algorithm, the autothrottle-autospeedbrake controller 28 transmits brake command signals to the speed brake controller 38, directing the speed brake controller 38 to control movement of the drag device(s) 24 in response to one or more of the data signals.

Figure 3:
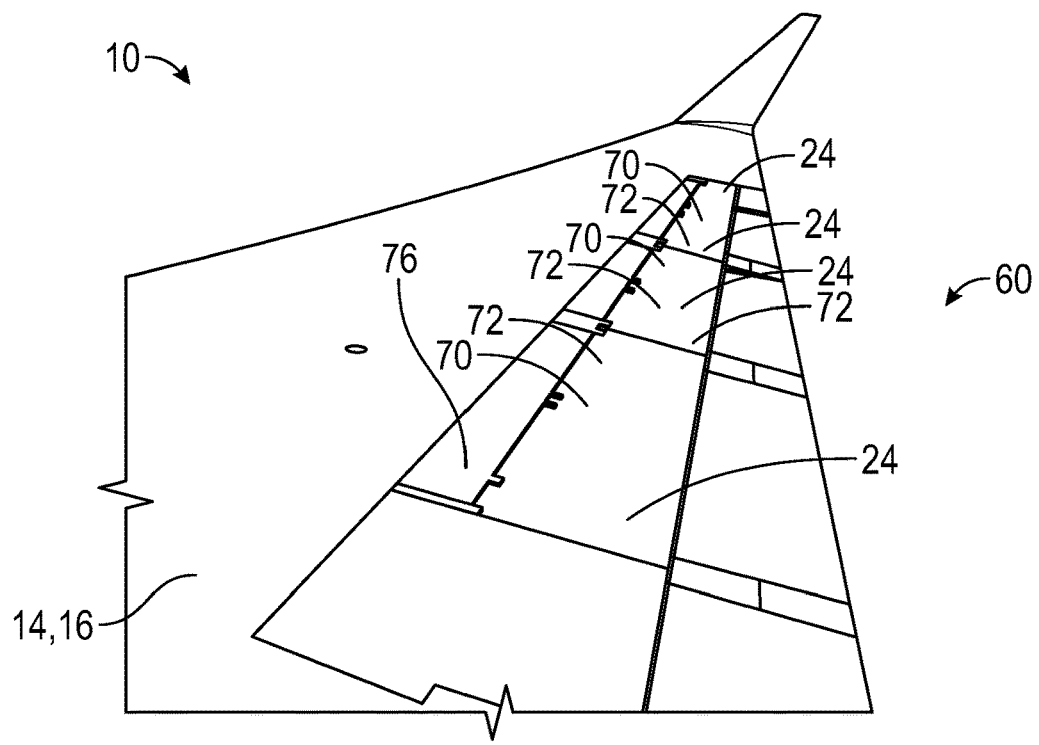
FIG. 3 illustrates a perspective view of a portion of an aircraft including a drag device in a stowed position in accordance with an exemplary embodiment.
Figure 4:
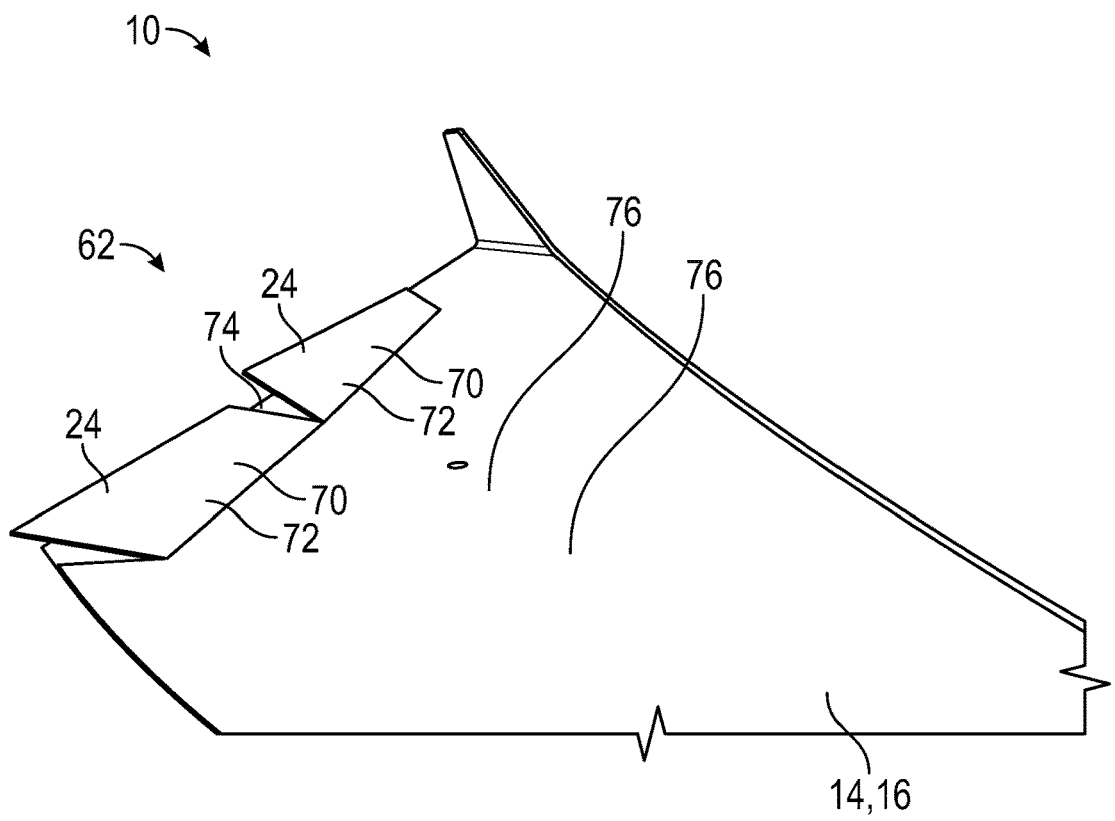
FIG. 4 illustrates a perspective view of a portion of an aircraft including a drag device in a deployed position in accordance with an exemplary embodiment.

Referring also to FIGS. 3-4, drag of the aircraft 10 is modulated or otherwise controlled by moving the drag device(s) 24 between a stowed or storage position(s) 60 and a deployed or extended position(s) 62. As used herein, the term "deployed position" is understood to be a position that is partially deployed, substantially fully deployed, or fully deployed. In an exemplary embodiment and as illustrated, the aircraft 10 includes a plurality of drag devices 24 configured as spoilers 70 that include panels 72 which are operatively coupled to the wings 14 and 16. When the spoilers 70 are in the stowed positions 60 as illustrated in FIG. 3, the panels 72 are oriented so as to be substantially aligned with the outer airfoil shaped of the upper portions 76 of the wings 14 and 16 so as to minimize drag. When the spoilers 70 are in the deployed position 62 as illustrated in FIG. 4, the panels 72 extend in an upward incline to the outer airfoil shaped of the upper portions 76 of the wings 14 and 16 so as to increase the drag created by the aircraft 10. The speed controller adjusts the throttle setting so that the aircraft's actual speed matches or substantially matches the target speed. Although the aircraft 10 is illustrated as having a plurality of similarly configured drag devices 24 that are mounted to the wings 14 and 16 of the aircraft 10, it is to be understood that the aircraft 10 may include a single drag device or a plurality of different-types of drag devices that may be mounted to the fuselage 12 and/or the wings 14 and 16. For example, the drag device(s) 24 may be a speed brake(s), an airbrake(s), a dive flap(s), a landing gear (e.g., partially extended landing gear as an airbrake), an air parachute(s), a combination thereof, and/or any other device(s) used to create drag for an aircraft known to those skilled in the art.

In an exemplary embodiment, the speed brake command signals transmitted by the autothrottle-autospeedbrake controller 28 include a deployment command signal(s) for directing deployment of the drag device(s) 24 and a stowage command signal(s) for directing stowage of the drag device(s) 24. When the speed brake controller 38 receives a deployment command signal(s) from the autothrottle-autospeedbrake controller 28, the speed brake controller 38 moves the drag device(s) 38 from the stowed position 60 to the deployed position 62 that was commanded. When the speed brake controller 38 receives the stowage command signal(s) from the autothrottle-autospeedbrake controller 28, the speed brake controller 38 moves the drag device(s) 24 from the deployed position 62 to the stowed position 60.

In an exemplary embodiment, when throttle position data signals correspond to an engine idle thrust (e.g., a low or lowest setting of the throttle position that corresponds to the engine(s) idling), and the aircraft speed data signals corresponding to a greater speed than the speed target data signals, the autothrottle-autospeedbrake controller 28 transmits a deployment command signal(s) to the speed brake controller 38 to deploy the drag device(s) 24. In another exemplary embodiment, when the autothrottle-autospeedbrake controller 28 receives the throttle position data signals corresponding to an engine idle thrust, and the aircraft altitude data signals corresponding to a greater altitude than the altitude target data signals, the autothrottle-autospeedbrake controller 28 transmits a deployment command signal(s) to the speed brake controller 38 to deploy the drag device(s) 24.

In an exemplary embodiment, when the aircraft speed data signals corresponding to about the same speed as or a lesser speed than the speed target data signals, the autothrottle-autospeedbrake controller 28 transmits the stowage command signal(s) to the speed brake controller 38 to stow the drag device(s) 24. In another exemplary embodiment, when the aircraft altitude data signals corresponding to about the same altitude as or a lesser altitude than the altitude target data signals, the autothrottle-autospeedbrake controller 28 transmits the stowage command signal(s) to the speed brake controller 38 to stow the drag device(s) 24.

Figure 5:
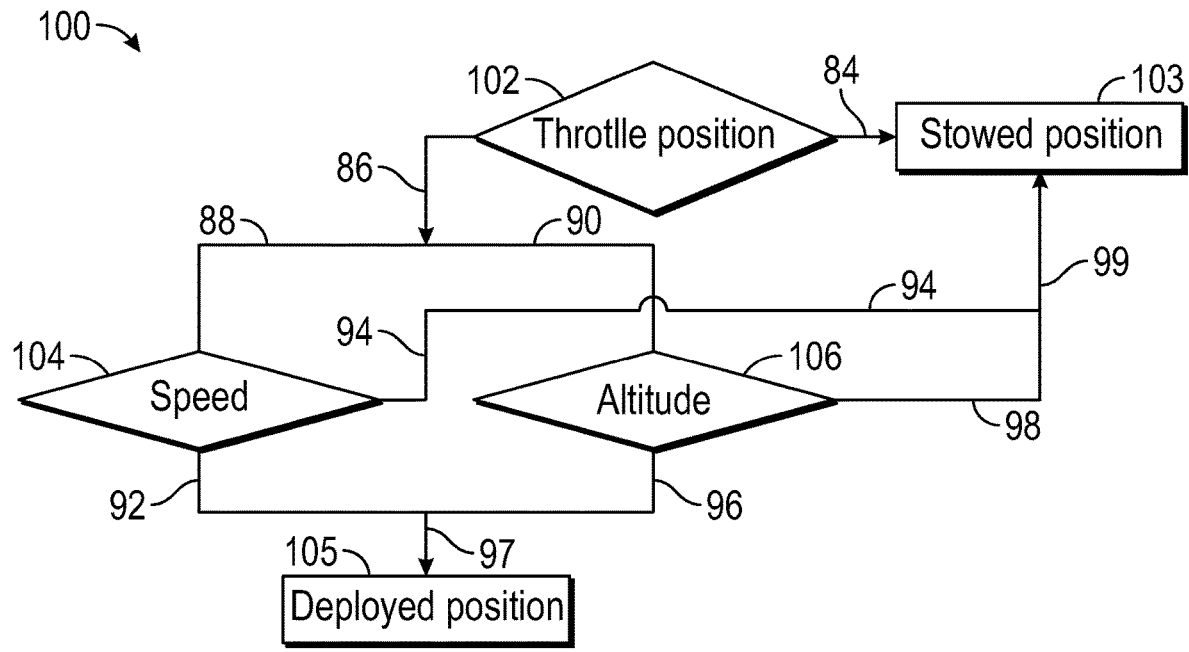
FIG. 5 illustrates a multivariate decision tree for controlling drag of an aircraft in accordance with exemplary embodiments.

FIG. 5 illustrates a multivariate decision tree 100 for various decision pathways of the automated speed brake functions of the thrust and drag control system 26 in accordance with an exemplary embodiment. In a first exemplary embodiment, when the throttle position data signal does not correspond to an engine idle thrust at box 102, the drag device(s) is stowed and/or in the stowed position at box 103 via line 84. If the throttle position data signal does correspond to an idle thrust, a multivariate decision pathway includes three possible variances for the operations of the automated speed brake functions via line 86 in accordance with an exemplary embodiment. The three variances are represented independently by lines 88, 90, and a combination of lines 88 and 90.

In an exemplary embodiment, in the variance represented via line 88, when the aircraft speed data signal corresponds to a greater speed than the speed target data signal at box 104, the drag device(s) is deployed and/or in the deployed position at box 105 via lines 92 and 97. Further, when the aircraft speed data signal corresponds to a speed that is not greater than the speed target data signal at box 104, the drag device(s) is stowed and/or in the stowed position at box 103 via lines 94 and 99.

In another exemplary embodiment, in the variance represented by line 90, when the aircraft altitude data signal corresponds to a greater altitude than the altitude target data signal at box 106, the drag device(s) is deployed or in the deployed position at box 105 via line 96 and 97. Further, when the aircraft altitude data signal corresponds to an altitude that is not greater than the altitude target data signal at box 106, the drag device(s) is stowed and/or in the stowed position at box 103 via lines 98 and 99.

In another exemplary embodiment, in the variance represented by the combination of lines 88 and 90, when the aircraft speed data signal corresponds to a greater speed than the speed target data signal at box 104 and the aircraft altitude data signal corresponds to a greater altitude than the altitude target data signal at box 106, the drag device(s) is deployed and/or in the deployed position at box 105 via lines 92, 96, and 97. Further, when the aircraft speed data signal corresponds to a speed that is not greater than the speed target data signal at box 104 and the aircraft altitude data signal corresponds to an altitude that is not greater than the altitude target data signal at box 106, the drag device(s) are stowed and/or in the stowed position at box 103 via lines 94, 98, and 99.

Figure 6:
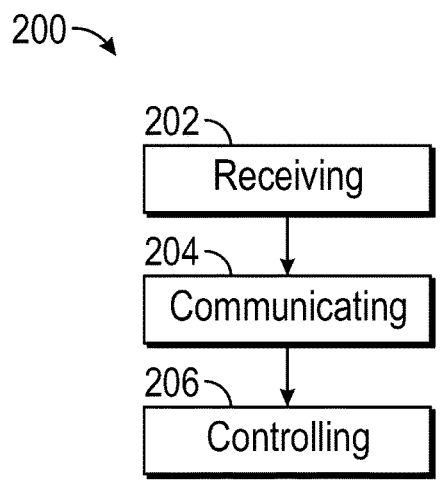
FIG. 6 illustrates a method for controlling drag of an aircraft in accordance with an exemplary embodiment.

FIG. 6 illustrates a method 200 for controlling drag of an aircraft in accordance with an exemplary embodiment. The method 200 includes receiving (STEP 202) a plurality of data signals to an autothrottle-autospeedbrake controller. The data signals include an aircraft speed data signal, an aircraft altitude data signal, and a speed target data signal.

A command signal is communicated (STEP 204) from the autothrottle-autospeedbrake controller to a speed brake controller in response to at least one of the data signals. The command signal is for moving a drag device. Movement of the drag device is controlled (STEP 206) between a stowed position and a deployed position via the speed brake controller in response to the command signal.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An aircraft comprising:
   an aircraft structure;
   a first drag device operatively coupled to the aircraft structure to move between a first stowed position and a first deployed position and/or a first intermediate deployed position;
   a speed brake controller in communication with the first drag device for controlling movement of the first drag device; and
   an autothrottle-autospeedbrake controller in communication with the speed brake controller and configured to receive a plurality of data signals including an aircraft speed data signal, an aircraft altitude data signal, a throttle position data signal, and a speed target data signal, and wherein the autothrottle-autospeedbrake controller is operative to direct the speed brake controller to control movement of the first drag device between the first stowed position and the first deployed position and/or the first intermediate deployed position in response to at least one of the data signals, wherein during descent of the aircraft, the autothrottle-autospeedbrake controller automatically directs the speed brake controller to deploy the first drag device from the first stowed position to one of the first deployed position and the first intermediate deployed position when the throttle position data signal corresponds to an engine idle thrust and the aircraft speed data signal corresponds to a greater speed than the speed target data signal to slow the aircraft to a target speed, and wherein during descent of the aircraft, the autothrottle-autospeedbrake controller automatically directs the speed brake controller to retract the first drag device from one of the first deployed position and the first intermediate deployed position to one of the first stowed position and the first intermediate deployed position prior to increasing the throttle position data signal from the engine idle thrust when the aircraft speed data signal corresponds to a lesser speed than the speed target data signal to increase speed of the aircraft to the target speed.

2. The aircraft of claim 1, wherein the first drag device is one of a speed brake, a spoiler, an airbrake, a dive flap, a landing gear, and an air parachute.

3. The aircraft of claim 1, wherein the aircraft comprises a plurality of drag devices including the first drag device and a second drag device, wherein the second drag device is operatively coupled to the aircraft structure to move between a second stowed position and a second deployed position and/or a second intermediate deployed position, wherein the speed brake controller is in communication with the second drag device for controlling movement of the second drag device, and wherein the autothrottle-autospeedbrake controller is operative to direct the speed brake controller to control movement of the second drag device between the second stowed position and the second deployed position and/or the second intermediate deployed position in response to the at least one of the data signals.

4. The aircraft of claim 3, wherein the aircraft structure includes a first wing and a second wing, and wherein the first drag device is coupled to the first wing and the second drag device is coupled to the second wing.

5. The aircraft of claim 4, wherein the first drag device and the second drag device are spoilers.

6. An auto speed brake control system for controlling drag of an aircraft, the auto speed brake control system comprising:
   a speed brake controller configured to communicate with a drag device for controlling movement of the drag device between a stowed position and a deployed position and/or an intermediate deployed position; and
   an autothrottle-autospeedbrake controller in communication with the speed brake controller and configured to receive a plurality of data signals including an aircraft speed data signal, an aircraft altitude data signal, a throttle position data signal, and a speed target data signal, and wherein the autothrottle-autospeedbrake controller is operative to direct the speed brake controller to control movement of the drag device between the stowed position and the deployed position and/or the intermediate deployed position in response to at least one of the data signals, wherein during descent of the aircraft, the autothrottle-autospeedbrake controller is configured to automatically direct the speed brake controller to deploy the first drag device from the first stowed position to one of the first deployed position and the first intermediate deployed position when the throttle position data signal corresponds to an engine idle thrust and the aircraft speed data signal corresponds to a greater speed than the speed target data signal to slow the aircraft to a target speed, and wherein during descent of the aircraft, the autothrottle-autospeedbrake controller is configured to automatically direct the speed brake controller to retract the first drag device from one of the first deployed position and the first intermediate deployed position to one of the first stowed position and the first intermediate deployed position prior to increasing the throttle position data signal from the engine idle thrust when the aircraft speed data signal corresponds to a lesser speed than the speed target data signal to increase speed of the aircraft to the target speed.

7. A method for controlling drag of an aircraft, the method comprising the steps of:
receiving a plurality of data signals to an autothrottle-autospeedbrake controller, wherein the data signals include an aircraft speed data signal, an aircraft altitude data signal, a throttle position data signal, and a speed target data signal;
communicating a command signal from the autothrottle-autospeedbrake controller to a speed brake controller in response to at least one of the data signals, wherein the command signal is for moving a first drag device; and
controlling movement of the first drag device between a first stowed position and a first deployed position and/or a first intermediate deployed position via the speed brake controller in response to the command signal, wherein during descent of the aircraft, the autothrottle-autospeedbrake controller automatically directs the speed brake controller to deploy the first drag device from the first stowed position to one of the first deployed position and the first intermediate deployed position when the throttle position data signal corresponds to an engine idle thrust and the aircraft speed data signal corresponds to a greater speed than the speed target data signal to slow the aircraft to a target speed, and wherein during descent of the aircraft, the autothrottle-autospeedbrake controller automatically directs the speed brake controller to retract the first drag device from one of the first deployed position and the first intermediate deployed position to one of the first stowed position and the first intermediate deployed position prior to increasing the throttle position data signal from the engine idle thrust when the aircraft speed data signal corresponds to a lesser speed than the speed target data signal to increase speed of the aircraft to the target speed.

* * * * *